United States Patent
Jung et al.

(10) Patent No.: US 9,551,819 B2
(45) Date of Patent: Jan. 24, 2017

(54) METHOD FOR MANUFACTURING POLARIZED LIGHT SPLITTING ELEMENT AND POLARIZED LIGHT SPLITTING ELEMENT

(71) Applicant: LG CHEM, LTD., Seoul (KR)

(72) Inventors: Jin Mi Jung, Daejeon (KR); Jong Byung Lee, Daejeon (KR); Bu Gon Shin, Daejeon (KR); Jae Jin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/421,611

(22) PCT Filed: Aug. 29, 2013

(86) PCT No.: PCT/KR2013/007795
§ 371 (c)(1),
(2) Date: Feb. 13, 2015

(87) PCT Pub. No.: WO2014/035173
PCT Pub. Date: Mar. 6, 2014

(65) Prior Publication Data
US 2015/0205026 A1    Jul. 23, 2015

(30) Foreign Application Priority Data

Aug. 29, 2012  (KR) ......................... 10-2012-0095099
Aug. 29, 2013  (KR) ......................... 10-2013-0103455

(51) Int. Cl.
*G02B 5/30*  (2006.01)
*B05D 5/06*  (2006.01)
*G02B 5/20*  (2006.01)

(52) U.S. Cl.
CPC .............. *G02B 5/3058* (2013.01); *B05D 5/06* (2013.01); *G02B 5/20* (2013.01); *G02B 5/30* (2013.01); *G02B 5/3025* (2013.01)

(58) Field of Classification Search
CPC ....... G02B 5/3058; G02B 5/3025; G02B 5/20; G02B 5/30; G02B 5/06
USPC ....................... 359/485.05, 487.03
See application file for complete search history.

(56) References Cited

U.S. PATENT DOCUMENTS

| 6,375,870 | B1 | 4/2002 | Visovsky et al. |
| 7,289,173 | B2* | 10/2007 | Kawazu .............. G02B 5/3058 349/100 |
| 2004/0239833 | A1* | 12/2004 | Kawazu .............. G02B 5/3058 349/96 |

(Continued)

FOREIGN PATENT DOCUMENTS

| CN | 101116018 A | 1/2008 |
| JP | 2000-147229 A | 5/2000 |

(Continued)

*Primary Examiner* — Frank Font
(74) *Attorney, Agent, or Firm* — Dentons US LLP (57) ABSTRACT

The present application relates to a method for manufacturing a polarized light splitting element and a polarized light splitting element. The present application can provide: a method for manufacturing the polarized light splitting element having excellent polarized light splitting ability and light-transmission ability through a simple and efficient process; and the polarized light splitting element having the excellent polarized light splitting ability and the light transmission ability.

19 Claims, 4 Drawing Sheets

(56) References Cited

U.S. PATENT DOCUMENTS

| | | | | |
|---|---|---|---|---|
| 2005/0201655 A1* | 9/2005 | Ellwood | .................. | G02B 6/02 |
| | | | | 385/11 |
| 2008/0018997 A1* | 1/2008 | Kawazu | ............... | G02B 5/3058 |
| | | | | 359/487.03 |
| 2009/0041971 A1* | 2/2009 | Wang | .................. | G02B 5/1809 |
| | | | | 428/54 |
| 2009/0053655 A1* | 2/2009 | Deng | .................. | G02B 5/1857 |
| | | | | 430/321 |
| 2009/0059367 A1* | 3/2009 | O'Malley | ............ | G02B 5/3058 |
| | | | | 359/487.01 |
| 2010/0072170 A1* | 3/2010 | Wu | ...................... | G02B 5/3058 |
| | | | | 216/13 |
| 2011/0084424 A1* | 4/2011 | Kaida | .................. | B29C 33/424 |
| | | | | 264/293 |
| 2013/0213690 A1 | 8/2013 | Lee et al. | | |

FOREIGN PATENT DOCUMENTS

| | | |
|---|---|---|
| JP | 2005181979 A | 7/2005 |
| JP | 2006220921 A | 8/2006 |
| JP | 2007121507 A | 5/2007 |
| JP | 2009109636 A | 5/2009 |
| JP | 2010-060636 A | 3/2010 |
| KR | 10-2002-0035587 A | 5/2002 |
| KR | 10-2003-0097839 A | 12/2003 |
| KR | 10-2006-0129970 A | 12/2006 |
| KR | 10-2008-0057063 A | 6/2008 |
| WO | 2012/063991 A1 | 5/2012 |

\* cited by examiner

METHOD FOR MANUFACTURING POLARIZED LIGHT SPLITTING ELEMENT AND POLARIZED LIGHT SPLITTING ELEMENT

This application is a National Stage Entry of International Application No. PCT/KR2013/007795, filed on Aug. 29, 2013, which claims priority to and the benefit of Korean Patent Application Nos. 10-2012-0095099, filed on Aug. 29, 2012 and 10-2013-0103455, filed on Aug. 29, 2013, all of which are incorporated herein by reference in their entirety.

TECHNICAL FIELD

The present application relates to a method for manufacturing a polarized light splitting element using a solution process and a polarized light splitting element manufactured thereby.

BACKGROUND ART

A polarized light splitting element, that is, an element which transmits one type of polarized light from light incident to the element, and absorbs or reflects the other types of polarized light, may be used for various purposes.

For example, the polarized light splitting element may be used to form a liquid crystal alignment layer. That is, a photo alignment layer capable of arranging liquid crystal molecules through a surface treated with irradiation of light is used as the liquid crystal alignment layer, the photo alignment layer may be formed by irradiating a photosensitive material layer, for example, with linearly polarized light, and orientationally ordering the photosensitive material, and the polarized light splitting element may be used for the formation of the linearly polarized light. For example, Patent Document 1 discloses an element prepared using aluminum as an example of the above-described polarized light splitting element.

Further, a type of the polarized light splitting element which transmits one polarized light from light incident to the element, and reflects another polarized light, for example, may also be used for a brightness enhancement film.

PRIOR ART DOCUMENT

[Patent Document 1] Korean Patent Publication No. 2002-0035587

DISCLOSURE

Technical Problem

The present application provides a method for manufacturing a polarized light splitting element and a polarized light splitting element.

Technical Solution

The present application relates to a method for manufacturing a polarized light splitting element. In the present specification, the term "polarized light splitting element" may denote all types of elements capable of extracting light in a polarized state from light incident to the element. In the above description, light in a polarized state may be linearly polarized, circularly polarized, or elliptically polarized light. In an embodiment, the polarized light may be linearly polarized light. In the above description, light in a polarized state may also be ultraviolet light or visible light. In the present specification, the term "ultraviolet ray" may denote, for example, an electromagnetic wave in a wavelength region of about 250 nm to about 350 nm, about 270 nm to about 330 nm, or about 290 nm to about 310 nm, and the term "visible light" may denote an electromagnetic wave in a wavelength region of about 360 nm to 700 nm or about 400 nm to 700 nm.

An exemplary splitting element may include a base material layer and a convex portion formed on the base material layer. The convex portion may be a metal convex portion. In the present specification, the term "metal convex portion" may denote a convex portion only formed of a metal or including a metal as a main component. In the above description, "including a metal as a main component" may denote that a metal has a content of 70 wt %, 75 wt %, 80 wt %, 85 wt % or 90 wt % or more of the convex portion. The convex portion may have a stripe shape, and at least two or more convex portions may be formed on the base material layer. The stripe-shaped convex portion may be positioned substantially parallel to each other on the base material layer. The number of convex portions formed in the stripe shape on the base material layer is not particularly limited, and for example, may be selected in consideration of an intensity of light to split. In general, about 2,000,000 to 10,000,000 of the convex portions per 1 $m^2$ may be present on the base material layer.

The splitting element may exhibit excellent separation efficiency with respect to a wide wavelength region of light, for example, a wide wavelength region of ultraviolet light or visible light. Separation efficiency of the splitting element may be defined by a ratio of an intensity of polarized light perpendicular to the stripe-shaped convex portion and an intensity of polarized light parallel to the convex portion in light which is transmitted to the splitting element. That is, the splitting element may show properties of transmitting light having a vector perpendicular to the convex portion (so-called P-polarized light), and reflecting and splitting light having a vector parallel to the convex portion (so-called S-polarized light), and efficiency may be defined by the ratio of P-polarized light and S-polarized light.

For example, in the splitting element, R calculated by the following Expression 1 may be 15 or more, 20 or more, 25 or more, 30 or more, 35 or more, 40 or more or 45 or more. The upper limit of R calculated by Expression 1 is not particularly limited. That is, the greater R is, the more excellent efficiency the splitting element shows. In consideration of practicality, R may be, for example, 2,000 or less, 1,500 or less, 1,000 or less, 900 or less, 800 or less, 700 or less, 600 or less, 500 or less, 400 or less, 300 or less, 200 or less, or 150 or less.

$$R=T_C/T_P \qquad \text{[Expression 1]}$$

In Expression 1, $T_C$ is transmittance of light with one wavelength from the wavelength in the range of 250 nm to 350 nm or 360 nm to 700 nm polarized in a direction perpendicular to the metal convex portion having a stripe shape with respect to the polarized light splitting element, and $T_P$ is transmittance of light with one wavelength of the wavelength in the range of 250 nm to 350 nm or 360 nm to 700 nm polarized parallel to the metal convex portion having a stripe shape with respect to the polarized light splitting element. The wavelength of light applied in Expression 1 may be in the range of about 270 nm to about 330 nm, or about 290 nm to about 310 nm.

Figure 1:
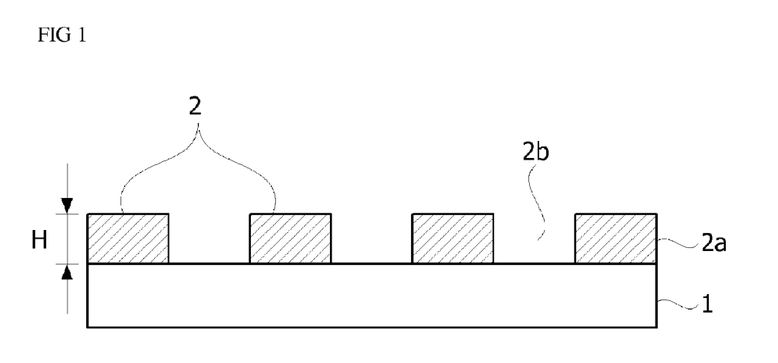
FIGS. 1 and 2 are views showing an exemplary polarized light splitting element.
Figure 2:
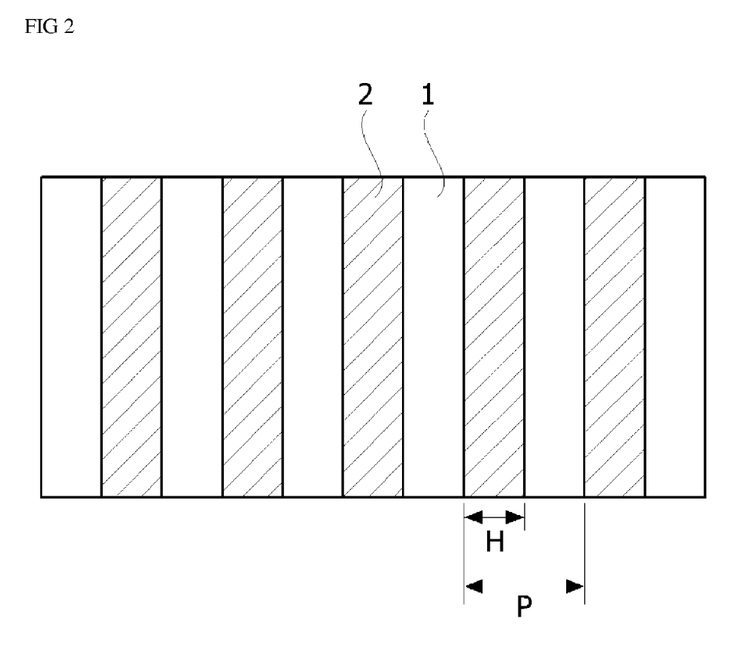

FIG. 1 is a view schematically showing a cross section of the exemplary polarized light splitting element, and FIG. 2 is a view schematically showing an upper side of the exemplary polarized light splitting element. As shown in FIGS. 1 and 2, the polarized light splitting element may include a base material layer 1 and a concavo-convex portion 2 formed on the base material layer 1.

Convex portions 2a forming the concavo-convex portion 2 may have a stripe shape and may be arranged in parallel. Here, a concave portion 2b is formed in the convex portion 2 between the convex portions 2a, a pitch, width, and height of the convex portion 2 may be adjusted in consideration whether a type of light to be split is ultraviolet light or visible light and in consideration of separation performance, for example, R according to Expression 1. In the present specification, the term "pitch P" denotes a distance of a sum of a width W of the convex portion 2a and a width W of the concave portion 2b (refer to FIG. 2), and the term "height H" denotes a height H of the convex portion (FIG. 1). When the height of the convex portions varies among the convex portions, the height may be a height of the highest convex portion, or may be an average value of the height of the convex portions.

For example, when the light to be split is ultraviolet light, a pitch P of the convex portions may be, for example, in the range of about 80 nm to 400 nm, about 100 nm to 300 nm, or about 150 nm to 250 nm. Further, a ratio W/P of the width W of the convex portions and the pitch P may be in the range of about 0.1 to 0.9, or about 0.15 to 0.8. Further, a ratio H/P of the height H of the convex portions and the pitch P may be in the range of about 0.3 to 1.5, 0.5 to 1.4, or about 0.6 to 1.3. The height may be, for example, in the range of about 20 nm to 450 nm, about 20 nm to 400 nm, or about 50 nm to 350 nm. In the above-described range of the pitch and height, the splitting element may exhibit a suitable ultraviolet ray and visible light splitting performance.

An exemplary method for manufacturing the polarized light splitting element in the present application may include forming the metal convex portion using a solution including a metal precursor. Accordingly, when the metal convex portion is formed using the solution including the metal precursor, the polarized light splitting element may be manufactured without expensive equipment, and through a simple process under relatively good conditions, and particularly, the polarized light splitting element may be easily manufactured even when forming a large-area polarized light splitting element.

A solution process, that is, a method for forming the metal convex portion using the solution including the metal precursor is not particularly limited.

For example, the method may include converting the metal precursor of the solution including the metal precursor filling the concave portion of the concavo-convex layer to a metal. The above-described process, for example, may include converting the metal precursor included in the solution to a metal after the concave portion of the concavo-convex layer of the substrate of which one surface has the concavo-convex layer is filled with the metal precursor solution.

Figure 3:
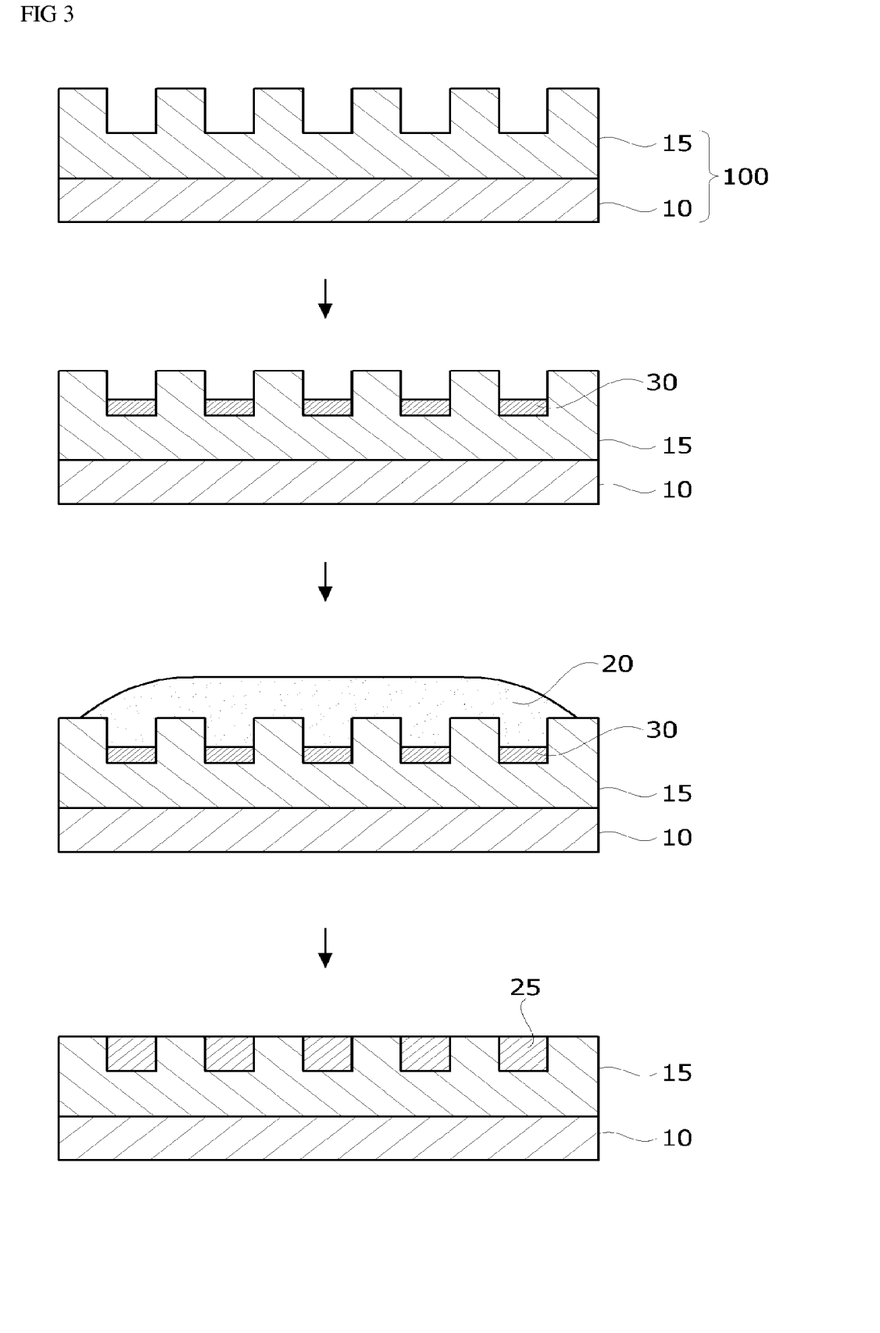
FIGS. 3 to 5 are views showing an exemplary method of manufacturing the polarized light splitting element.
Figure 4:
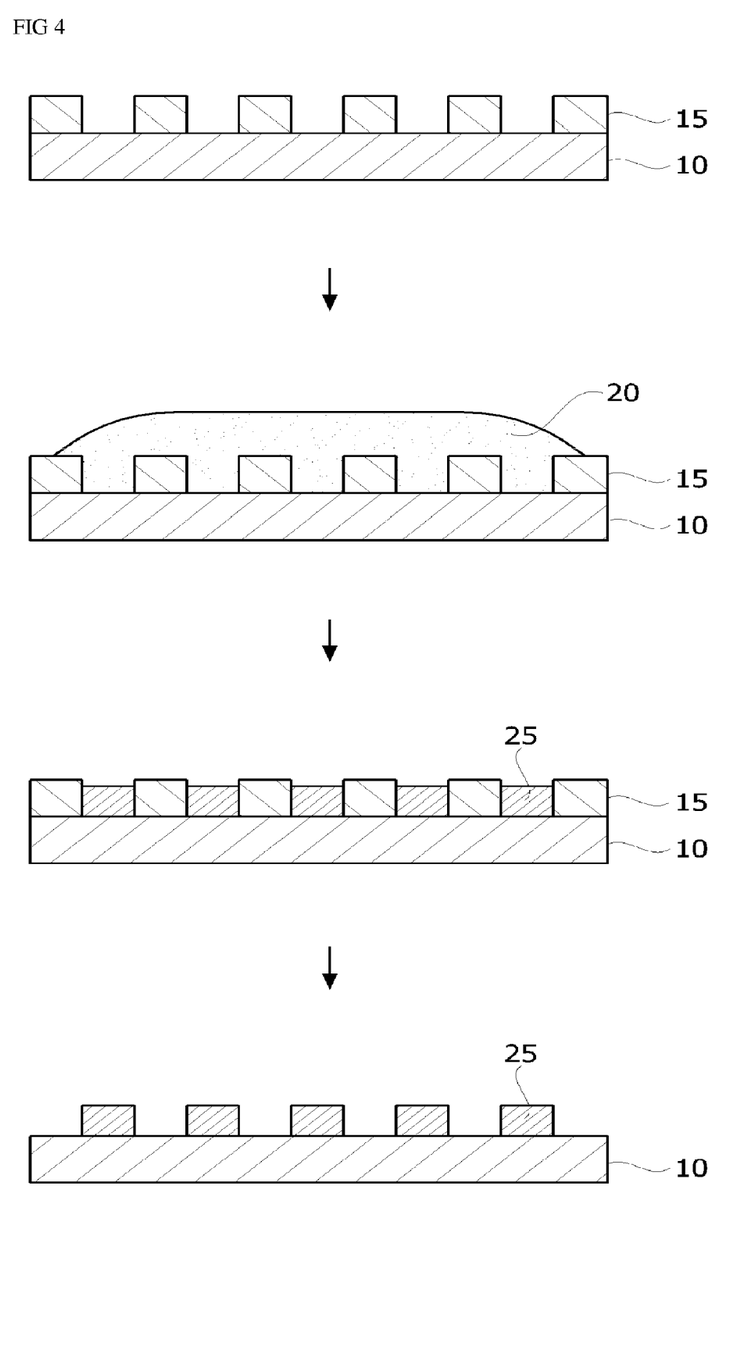

FIG. 3 or FIG. 4 is a view exemplarily showing the above-described method. That is, as shown in FIG. 3 or FIG. 4, the method may be performed using a substrate 100 of which one surface has the concavo-convex layer. In the above description, any well-known light transmitting substrate may be used as the substrate 100 without particular limitation. For example, a substrate having transmittance of 70% or more with respect to light in any wavelength range included in the wavelength band of ultraviolet light or visible light may be applied as the substrate.

For example, as the substrate 100, a plastic substrate such as polyethylene terephthalate (PET), polycarbonate (PC), poly(methyl methacrylate) (PMMA), polyvinyl alcohol, (PVA), polyether sulfone (PES), ethylene vinyl acetate (EVA), or the like; a glass substrate; a quartz substrate, or the like may be used. For example, the quartz substrate which shows high transmittance with respect to light in the wavelength region of visible light and ultraviolet light, and has good resistance with respect to ultraviolet light, heat, or the like may be applied.

A concavo-convex layer may be formed on one surface of the substrate 100. The concavo-convex layer may serve as a master to form the metal convex portion 25. Accordingly, a pitch of the concavo-convex layer, a difference in the heights of the concave portion and the convex portion or the like may be adjusted in consideration of a pitch and height of a desired metal convex portion. For example, when the splitting element is applied with respect to ultraviolet light as described above, a pitch of the metal convex portion may be formed in the range of 80 to 400 nm, and a height thereof may be formed in the range of 0.2 to 1.5 times the pitch. For this, a pitch of the concavo-convex layer may also be formed in the range of about 80 nm to 400 nm, 100 nm to 300 nm, or 150 nm to 250 nm, and a difference in the heights of the concave portion and the convex portion of the concavo-convex layer corresponding to the height of the metal convex portion may be in the range of 0.3 times to 1.5 times, 0.5 times to 1.4 times, or 0.7 times to 1.3 times the pitch. When the concavo-convex layer is adjusted as described above, the polarized light splitting element which shows excellent separation efficiency with respect to ultraviolet light and maintains excellent light transmittance or the like may be formed.

The concavo-convex layer may be formed using a well-known method, such as etching a surface of the substrate or the like, or using a polymer material or the like on the substrate. That is, for example, the substrate 100 on which the concavo-convex layer is formed may include a light transmitting substrate 10; and a resin layer 15 which is the concavo-convex layer formed on the light transmitting substrate. The resin layer 15 which is the concavo-convex layer, for example, may be formed using a well-known method of forming the concavo-convex shape such as e-beam lithography, interference lithography, a nano-imprinting process, etc. A material of the resin layer 15 is also not particularly limited, and the resin layer 15 may be formed using a well-known material, for example, such as a photocurable polyolefin, a (meth)acrylate resin, a urethane resin, an epoxy resin, an imide resin, etc.

A method of filling the concave portion of the concavo-convex layer with a metal precursor solution 20 is not particularly limited. For example, filling may be performed using a method of spin coating, deep coating, spray coating, bar coating, etc. Further, the metal precursor solution 20 may fill using a method of immersing the substrate in the precursor solution and causing a reaction, which is similar to the deep coating method.

A conversion of the metal precursor in the solution to the metal after filling the metal precursor solution may be performed using a suitable method in consideration of a type of the metal precursor. For example, the metal precursor may be converted to the metal by treating the metal precursor with heat. When the solution includes a solvent or the like, such component as a solvent or the like may be removed by the heating process, the metal precursor is converted to the metal simultaneously, the degree of bonding of the metal or the like increases in the process, and thereby the metal convex portion may be formed.

Conditions of the heating process may be adjusted in consideration of a composition of the metal precursor solution 20, for example, a content of the precursor, a type of the solvent, etc. For example, when the metal precursor is an aluminum precursor or the like, the heating process may be performed at a temperature in the range of about 20° C. to 300° C., 60° C. to 300° C., or 80° C. to 250° C. In the above-described range, converting the metal precursor to the metal and sintering may be sufficiently induced, and a generation of air bubbles on the metal convex portion may be prevented. A time of the heating process is not particularly limited, and may be adjusted according to a temperature of the heating process in consideration of conversion efficiency of the metal precursor, etc.

A metal convex portion 25 may be formed in a shape corresponding to the concave portion of the concavo-convex layer formed on one surface of the substrate 100 through the above-described process. For example, the metal convex portion 25 may be formed to have a pitch in the range of about 80 nm to 400 nm, 100 nm to 300 nm or 150 nm to 250 nm, and a height in the range of about 20 nm to 450 nm, 20 nm to 400 nm, or 50 nm to 350 nm.

As needed, a process of removing the concavo-convex layer from the substrate may be further performed after the metal convex portion is formed as shown in FIG. 4. The concavo-convex layer may be removed in the heating process along with a conversion of the metal precursor to the metal, and the remaining concavo-convex layer may be removed through an additional process after the heating process as needed. Further, as needed, the concavo-convex layer itself may be applied as the polarized light splitting element without being removed as shown in FIG. 3.

The concavo-convex layer 15 may be removed through the heating process or using an etching method such as dry etching, wet etching, etc. When the resin layer 15 is removed by the heating process, a temperature of the heating process may be selected in consideration of a material of the resin layer 15, physical properties of the formed metal convex portion 25, for example, such as appearance of crystals or the like. For example, the heating process may be performed at a temperature in the range of about 250° C. to 900° C., or about 300° C. to 800° C. Further, a processing time of the heating process may be adjusted to a suitable range in consideration of a temperature of the heating process or removal efficiency of the resin layer.

In another embodiment, a process of forming the metal convex portion may include changing the metal precursor into a metal in a state in which a first substrate of which one surface has a solution layer including the metal precursor and a second substrate of which one surface has a concavo-convex layer are laminated to face the solution layer including the metal precursor and the concavo-convex layer.

Figure 5:
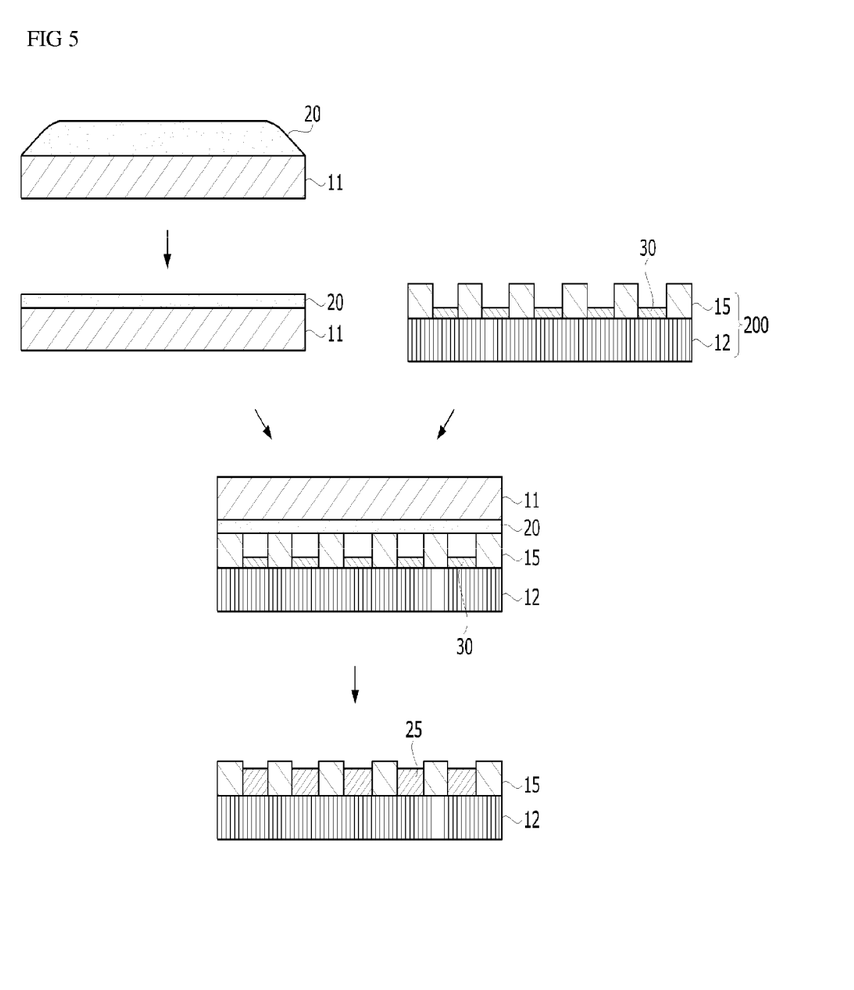

The above-described process, for example, may include preparing the first substrate 11 of which one surface has the metal precursor solution layer 20 and the second substrate 200 of which one surface has a concavo-convex layer, laminating both substrates 11, 200 so as to face the metal precursor solution layer 20 and the concavo-convex layer of the second substrate, converting the metal precursor of the solution layer to the metal in the laminated substrates, and thereby forming the metal convex portion 25 as shown in FIG. 5. In the process, a process of removing the first substrate 11 from the second substrate 200 may be further performed following the above-described process.

In the above-described method, a well-known material may be used as the first or second substrate without particular limitation, and for example, the same type of the substrate as the substrate applied to the substrate 10 in the embodiments shown in the FIGS. 3 and 4 may be selected. However, the first substrate 11, as a substrate for temporary use, is not necessarily a light-transmitting substrate.

The first substrate 11 of which one surface has the metal precursor solution layer 20 may be formed by applying the metal precursor solution on the first substrate 11. A method of applying is not particularly limited, and may include a spin coating method, a deep coating method, a spray coating method, a bar coating method, etc. A thickness of the layer 20 of the first substrate 11 is not particularly limited, and may be adjusted to the degree in which a suitable metal convex portion is transferred and grown on the concave portion of the second substrate 200.

The second substrate 200 of which one surface has the concavo-convex layer, for example, may be formed in the same manner as forming the concavo-convex layer on the substrate 100 in the embodiments shown in FIGS. 3 and 4. That is, in the embodiment, the second substrate 200 may include a light transmitting substrate 12; and a resin layer 15 which is the concavo-convex layer formed on the light transmitting substrate. In the above description, a method of forming the resin layer 15 which is the concavo-convex layer, a material, a value of a pitch, or the like of the resin layer 15 are equally applied as described above.

The first substrate 11 may be laminated on the second substrate 200 such that the layer 20 of the first substrate faces the concavo-convex layer of the second substrate after the first substrate 11 and the second substrate 200 are formed. Here, a laminating method is not particularly limited, but when a sol-gel solution which will be described below is used as the solution, the layer 20 formed on the first substrate 11 may be solidified by a hydration and condensation reaction with moisture in the air, and thus laminating may be rapidly performed under conditions of minimized moisture.

The metal convex portion 25 may be formed on the second substrate 200 by converting the metal precursor to the metal in the laminated state. For example, the conversion may be performed by the above-described heating process. Accordingly, when the heating process is performed in a state in which the substrates are laminated, the metal convex portion 25 may be formed on the concave portion of the concavo-convex layer formed on the second substrate 200. Conditions of performing the heating process are not particularly limited, for example, conditions described in the embodiments of FIG. 3 and/or FIG. 4 may be equally applied, and accordingly, the metal convex portion may be formed in the shape corresponding to the concave portion of the concavo-convex layer of the second substrate 200.

As shown in FIG. 5, the first substrate 11 may be removed from the second substrate 200 after the metal convex portion 25 is formed on the second substrate 200. As needed, a process of removing the resin layer which is the concavo-convex layer formed on the second substrate using an etching method such as dry etching, wet etching, or the like may be additionally performed after the metal convex portion is formed as in the same manner as described in the embodiment of FIG. 4.

In the embodiment as described above, the concavo-convex layer, for example, the concave portion of the concavo-convex layer filled with the metal precursor solution in the embodiment of FIG. 3 or FIG. 4, or the concave portion of the concavo-convex layer on the second substrate in the embodiment of FIG. 5 may be coated with a catalyst. The metal convex portion may be effectively formed by the above-described catalyst. FIGS. 3 and 5 show that the concave portion is coated with the catalyst 30.

Any catalyst capable of effectively supporting the conversion of the metal precursor to the metal may be used as the catalyst in consideration of a type of the metal precursor. Representatively, examples of the catalyst may include a titanium alkoxide, a titanium halide, or a chelate compound thereof, an iron alkoxide, a silicon halide, a vanadium oxyhalide, titanium boron hydride or a chelate compound thereof, a metal or a metal composite, or the like, and the above-described catalyst, for example, may be suitable when an aluminum precursor is used. In the above description, examples of a titanium-based catalyst such as a titanium alkoxide, a titanium halide, or a chelate compound thereof, titanium boron hydride, or a chelate compound thereof, or the like may include $Ti\{OCH(CH_3)_2\}_4$, $TiCl_3$, $TiCl_4$, $Ti(O-n-C_4H_9)_4$, $TiBr_4$, $Ti(O-C_2H_5)_4$, $TiCl_4 2.(O(C_2H_5)_2)$, $TiCl_2.(O(C_2H_5)_2)_2$, $TiCl_2.(OC_3H_7)_2$, $Ti(BH_4)_2.2(O(C_2H_5)_2)$, or the like, examples of an iron alkoxide may include $Fe(OC_2H_5)_2$, or the like, examples of a silicon halide may include $SiCl_4$, or the like, and examples of a vanadium oxyhalide may include $VOCl_3$, $VOCl_2$ or the like. Further, examples of the metal or metal composite may include a metal layer or particles converted to a transition metal such as Ti, Pd, Pt, Al, Cu, Si, Au, Fe, or the like, a layer or particles of the composite metal such as $Al_3Ti$, or the like formed of two or more of the above-described metals, but are not limited thereto.

The above-described catalyst layer, for example, may allow the metal precursor to be sufficiently transferred to the concave portion of the concavo-convex layer by the heating process and grown. A method of forming the catalyst layer is not particularly limited, and may be performed using a well-known coating method.

A type of the metal precursor included in the metal precursor solution applied in the above-described method is not particularly limited. For example, the metal precursor may be an Al precursor, Pt precursor, Ag precursor, Cu precursor, Au precursor, Ni precursor, Pb precursor, W precursor, Ir precursor, Mo precursor, Fe precursor, Ti precursor, Cr precursor, or Co precursor, and for example, may be an Al precursor, Pt precursor, Ag precursor, or Al precursor. Further, the metal precursor may be a mixture of two or more types of precursors. Further, as the metal precursor, for example, a well-known material may be used without particular limitation as long as the material may be converted to the metal by the above-described heating process.

In the embodiment, the metal precursor, for example, may be a metal hydride. That is, a hydride of each of the above-described metals may be used as the metal precursor in the process.

For example, the metal hydride may be represented by the following Formula 1.

[Formula 1]

In Formula 1, R is hydrogen or an alkyl group, Q is Al, Pt or Ag, X is X is a group 15 or group 16 element, or is absent, A is a halogen atom, an alkyl group or a hetero ring residue having nitrogen atoms and carbon atoms as a ring-forming atom, n is an integer in the range of 1 to 4, m is an integer in the range of 1 to 8, and p is an integer in the range of 1 to 2.

In Formula 1, when one R is present, R is hydrogen, and when a plurality of R is present, each R may be identical or different, but at least one of R is hydrogen.

Further, in Formula 1, when a plurality of $[XA_m]$ is present, each $[XA_m]$ may be identical or different.

Further, the case in which X is absent in Formula 1 may denote that A which may be an alkyl group, a halogen atom, or a hetero ring residue is directly linked to aluminum.

Further, in Formula 1, the hetero ring residue may be a hetero ring residue which has nitrogen and carbon atoms as a ring-forming atom, and has 3 to 6 ring-forming atoms including only one nitrogen atom.

Further, in Formula 1, examples of X may include a nitrogen atom, oxygen atom, or the like, but is not limited thereto.

Further, in Formula 1, the alkyl group, for example, may be a straight chain, branched chain, or cyclic alkyl group having 1 to 20 carbon atoms, 1 to 16 carbon atoms, 1 to 12 carbon atoms, 1 to 8 carbon atoms, or 1 to 4 carbon atoms.

Examples of the metal precursor may include $H_3AlO(C_4H_9)_2$, $C_5H_{14}NAl$ (methylpyrrolidine alane), $H_3AlC_2H_5N(CH_3)_2$, $H_2PtCl_6$(hexachloroplatinic acid), or the like, but are not limited thereto.

A metal hydride as described above, for example, may be manufactured by reacting a metal halide such as aluminum chloride and a metal hydride such as over-hydrogenated lithium aluminum, etc.

A ratio of the metal precursor in the metal precursor solution is not particularly limited, and may be selected in a suitable range in consideration of desired process efficiency. For example, the metal hydride may be included at a concentration of about 0.1 to 30 wt %, 0.5 to 25 wt % or 1 to 20 wt % in the solution.

As a solvent of the metal precursor solution, for example, an ether or alcohol may be used, and examples of the ether may include dimethyl ether, diethyl ether, diprophyl ether, dibutyl ether, dipantyl ether, etc. Further, examples of the alcohol may include methanol, ethanol, propanol, isopropanol, butanol, or the like as an alcohol having 1 to 20 carbon atoms, 1 to 16 carbon atoms, 1 to 12 carbon atoms, 1 to 8 carbon atoms, or 1 to 4 carbon atoms.

The metal precursor solution may further include a catalyst as needed. Examples of the catalyst, for example, may include an acid catalyst, metal particles, or the like, and specifically, hydrochloric acid, nitric acid, acetic acid, ammonia, potassium hydroxide, an amine-based compound, or the like may be used as the acid catalyst. Further, platinum particles, silver particles, or the like may be used as the metal particles.

An amount of the catalyst is not particularly limited, and may be adjusted to a suitable range.

Further, the catalyst may be changed into a mono-crystalline particle which promotes a reaction in the solution such that metal crystals grow in a position where the catalyst is applied, in other words, a seed. In the present specification, the term "seed" may denote a small mono-crystalline particle which becomes a core when crystals are grown in the solution, and specifically, may be a material such as an aluminum seed, platinum seed, solver seed, or the like in the present application.

The present application also relates to a polarized light splitting element. An exemplary polarized light splitting element may include a base material layer; and a metal convex portion formed on the base material layer. A specific structure of the above-described polarized light splitting element is the same as the structure described above. For example, the number of the metal convex portion of the polarized light splitting element may be two or more, and each metal convex portion may have a stripe shape and may be in parallel. A pitch and height of the metal convex portion may be the same as the pitch and height described above.

The polarized light splitting element may show an excellent degree of polarization, and for example, may have a degree of polarization D of 0.8 or more, 0.82 or more, 0.85 or more, 0.87 or more or 0.9 or more according to the following Expression 2. The upper limit of the degree of polarization D is not particularly limited, and for example, may be less than 1.

$$D=(T_P-T_C)/(T_P+T_C) \quad \text{[Expression 2]}$$

In Expression 2, $T_P$ is transmittance of light with the wavelength of 400 nm, 550 nm, or 800 nm polarized parallel to the metal convex portion having a stripe shape with respect to the polarized light splitting element, and $T_C$ is transmittance of light with the wavelength of 400 nm, 550 nm, or 800 nm polarized in a direction perpendicular to the metal convex portion having a stripe shape with respect to the polarized light splitting element.

In the polarized light splitting element, the metal convex portion may be formed of a metal precursor, for example, of the above-described metal precursor.

The polarized light splitting element having an excellent polarized light splitting performance as described above may be manufactured by a solution process using a solution including a metal precursor, for example, by the above-described method for manufacturing the polarized light splitting element.

The polarized light splitting element as described above, for example, may be applied to an alignment process of a photo alignment layer for a liquid crystal, or may be applied as a brightness enhancing film, etc.

The present application also relates to a device including the polarized light splitting element, for example, a light irradiation device. An exemplary device may include equipment capable of holding the polarized light splitting element and an object to be irradiated.

The polarized light splitting element may function as a polarizing plate. The element, for example, may be used to generate linearly polarized light from light radiated from a light source.

The device may further include a light alignment mask between the equipment holding the object to be irradiated and the polarized light splitting element.

In the above description, the mask, for example, may be installed to have a distance of about 50 mm or less from a surface of the object to be irradiated which is held by the equipment. The distance, for example, may be more than 0 mm, 0.001 mm or more, 0.01 mm or more, 0.1 mm or more, or 1 mm or more. Further, the distance may be 40 mm or less, 30 mm or less, 20 mm or less, or 10 mm or less. A distance between the surface of the object to be irradiated and the mask may be designed by various combinations of the upper limit and lower limit described above.

A type of the equipment holding the object to be irradiated is not particularly limited, and may include all types of equipment designed such that the object to be irradiated is stably maintained while light is radiated.

Further, the device may additionally include a light source capable of radiating light, for example, ultraviolet light onto the mask or the polarized light splitting element. Any light source capable of radiating light in a direction of the mask or the polarized light splitting element may be used without particular limitation according to purpose. For example, examples of the light source, as a light source which may radiate ultraviolet light, may include a high-pressure mercury ultraviolet lamp, a metal halide lamp, or a gallium ultraviolet lamp, etc.

The device may further include one or more light-collecting plates for adjusting an amount of light radiated from the light source. The light-collecting plate, for example, may be included in the device such that light radiated from the light source is incident to the light-collecting plate, collected, and the collected light is radiated onto the polarized light splitting element and the mask. Any light-collecting plate generally used in the related art may be used as long as the light-collecting plate is formed to collect light radiated from the light source. Examples of the light-collecting plate may include a layer of a lenticular lens, etc.

For example, the light irradiation device includes equipment sequentially holding the light source, the light-collecting plate, the polarized light splitting element, the mask, and the object to be irradiated. Light radiated from the light source is incident to the light-collecting plate first, collected, and incident to the polarizing plate again. Light incident to the polarizing plate may be generated as linearly polarized light, incident to the mask again, and guided by an opening part to be radiated onto the surface of the object to be irradiated.

The present application relates to a method for radiating light. The exemplary method may be performed using the light irradiation device described above. For example, the method may include placing the object to be irradiated in the device capable of holding the object to be irradiated, and irradiating the object to be irradiated with light by the polarized light splitting element and the mask.

In the embodiment, the object to be irradiated may be a photo alignment layer. Here, the method for radiating light may be a method for manufacturing an aligned photo alignment layer. For example, the photo alignment layer of which photo alignment properties are expressed may be manufactured by radiating linearly polarized light or the like by the polarized light splitting element and the mask while the photo alignment layer is held by the device, and aligning photo-sensitive materials included in the photo alignment layer in a predetermined direction.

A type of the photo alignment layer which may be applied in the method is not particularly limited. As a compound including a photosensitive residue, various types of the photo alignment compounds capable of being used to form the photo alignment layer are known in the related art, and all known materials described above may be used to form the photo alignment layer. Examples of the photo alignment compounds may include, for example, a compound aligned by trans-cis photoisomerization; a compound aligned by photo-destruction such as chain scission, photo-oxidation, or the like; a compound aligned by photocrosslinking or photopolymerization such as [2+2] cycloaddition, [4+4] cycloaddition, or the like; a compound aligned by a photo-Fries rearrangement; a compound aligned by a ring opening/closure reaction, etc. Examples of the compounds aligned by trans-cis photoisomerization may include, for example, an azo compound such as a sulfonated diazo dye, azo polymer, or the like, a stilbene compound, and the like, and examples of the compounds aligned by photo-destruction may include cyclobutane-1,2,3,4-tetracarboxylic dianhydride, an aromatic polysilane, polyester, polystyrene, a polyimide, etc. Further, examples of the compounds aligned by photocrosslinking or photopolymerization may include a cinnamate compound, a coumarin compound, a cinnamamide compound, a tetrahydrophthalimide compound, a maleimide compound, a benzophenone compound, a diphenylacetylene compound, a compound having a chalconyl residue as a photosensitive residue (hereinafter, referred to as a chalcone compound), a compound having an anthracenyl residue hereinafter, referred to as an anthracenyl compound), etc. Examples of the compounds aligned by a photo-Fries rearrangement may include aromatic compounds such as a benzoate compound, a benzoamide compound, a methacrylamidoaryl methacrylate compound, or the like, and examples of the compound aligned by a ring opening/closure reaction may include a compound aligned by a ring opening/closure reaction of a [4+2] π-electronic system such as a spiropyran compound, or the like, but the compounds are not limited thereto. The photo alignment layer may be formed through a known method using the photo alignment compound described above. For example, the photo alignment layer may be formed on a suitable supporting substrate using the above-described compound, and the photo alignment layer may be applied in the method by being transferred by the device capable of holding the object to be irradiated, for example, by a roll.

In the method, the photo alignment layer being irradiated with light by the polarized light splitting element and the mask may be a first-alignment treated photo alignment layer. The first-alignment treatment may be performed by irradiating the photo alignment layer, for example, an entire surface of the photo alignment layer with ultraviolet light which is linearly polarized in a predetermined direction through the polarized light splitting element before light is radiated by the mask. When the first-alignment treated photo alignment layer is irradiated with light by the mask, but the irradiated light is polarized in a direction different from the direction upon the first alignment treatment, light is only radiated onto a region of the photo alignment layer corresponding to the opening part, the photo alignment compounds are realigned, and thereby the photo alignment layer in which an alignment direction of the photo alignment compounds is patterned may be manufactured.

For example, when linearly polarized ultraviolet light is radiated one or more times to align the photo alignment compounds, an alignment of the photo alignment layer is determined by a polarization direction of light finally radiated. Accordingly, when the photo alignment layer is irradiated with ultraviolet light which is linearly polarized in a predetermined direction through the polarized light splitting element to perform the first-alignment treatment, and then only a predetermined part of the photo alignment layer is exposed to light linearly polarized in a direction different from the direction of light used in the first-alignment treatment by the mask, a direction of the photo alignment layer may be changed to be different from the direction of light upon the first-alignment treatment only at the predetermined part irradiated with light. Accordingly, two or more types of alignment regions having different patterns or alignment directions which at least include a first alignment region in a direction of the first-alignment treatment and a second alignment region in a direction different from the direction of the first-alignment treatment may be formed on the photo alignment layer.

In the embodiment, an angle formed by a polarization axis of linearly polarized ultraviolet light radiated upon the first-alignment treatment and a polarization axis of linearly polarized ultraviolet light radiated upon the second-alignment treatment performed by the mask after the first-alignment treatment may be perpendicular. In the above description, the perpendicularity may denote substantial perpendicularity. The photo alignment layer manufactured by adjusting the polarization axis of light radiated upon the first and second-alignment treatments using the above-described method, for example, may be used as an optical filter which may realize a stereoscopic image.

For example, an optical filter may be manufactured by forming a liquid crystal layer on the photo alignment layer formed as described above. A method of forming the liquid crystal layer is not particularly limited, and for example, the liquid crystal layer may be formed by applying and aligning liquid crystal compounds which may be crosslinked or polymerized by light on the photo alignment layer, and then irradiating the liquid crystal compound layer with light to be crosslinked or polymerized. Through the above-described processes, the liquid crystal compound layer is aligned according to the alignment of the photo alignment layer and fixed, and thereby a liquid crystal film including two or more types of regions having different alignment directions may be produced.

A type of the liquid crystal compound applied on the photo alignment layer is not particularly limited, and may be suitably selected according to the use of the optical filter. For example, when the optical filter is a filter to realize a stereoscopic image, the liquid crystal compound may be aligned according to an alignment pattern of the photo alignment layer present at a lower part, and may be a liquid crystal compound showing retardation properties of $\lambda/4$ by photocrosslinking or photopolymerization. The term "retardation properties of $\lambda/4$" may denote properties capable of retarding incident light ¼ times the wavelength of the light. When the above-described liquid crystal compound is used, for example, the optical filter which may divide incident light into left circularly polarized light and right circularly polarized light may be manufactured.

A method of applying the liquid crystal compound and performing an alignment treatment, that is, aligning the liquid crystal compound according to the alignment pattern of the lower photo alignment layer, or a method of crosslinking or polymerizing the aligned liquid crystal compound is not particularly limited. For example, the alignment may be performed at a suitable temperature in which the compound may show liquid crystal properties according to the type of the liquid crystal compound. Further, crosslinking or polymerization may be performed by irradiating the liquid crystal layer with light which may induce suitable crosslinking or polymerization according to the type of the liquid crystal compound.

The present application also relates to a display device including the polarized light splitting element. In the device, the polarized light splitting element may be applied, for example, as a reflective polarizing plate for enhancing brightness. For example, a structure in which the reflective polarizing plate is applied in the liquid crystal display device for enhancing brightness has been already known, and in the well-known structure, the polarized light splitting element may be applied as the reflective polarizing plate. Accordingly, for example, the display device may include a liquid crystal panel of which an upper and lower parts are provided with absorption type polarizing plates, and a light source such as a backlight positioned at a lower part of the absorption type polarizing plate provided at a lower part, or the like, and the polarized light splitting element may be disposed between the absorption type polarizing plate provided at a lower part and the light source.

Advantageous Effects

In the present application, a method for manufacturing the polarized light splitting element having excellent polarized light splitting ability and light-transmission ability through a simple and efficient process, and the polarized light splitting element having the excellent polarized light splitting ability and the light transmission ability may be provided.

MODES OF THE INVENTION

Hereinafter, contents of the present application will be further described in conjunction with examples or the like according to the present application, but a scope of the present application is not limited to the examples or the like described below.

Preparation Example 1

Preparation of Metal Precursor Solution

A solution including $H_3AlO(C_4H_9)_2$ which is an aluminum precursor as a metal precursor was prepared. 0.266 g of aluminum chloride ($AlCl_3$) and 0.224 g of over-hydrogenated lithium aluminum ($LiAlH_4$) were placed into a flask, reacted by heating and stirring at a temperature of 70° C. for 1 hour in the presence of argon using 100 ml of dibutyl ether as a solvent, LiCl which was deposited after a reaction was removed by filtering, and thereby the solution including $H_3AlO(C_4H_9)_2$ which is an aluminum precursor as a metal precursor was prepared.

Example 1

Preparation of Polarized Light Splitting Element A

An acrylic resist (product name: MR8010R; manufactured by Micro resist technology GmbH) was applied on a quartz substrate having a thickness of 5 mm, and thereby a resist layer was formed having a thickness of about 100 nm. The resist layer was heated at a temperature of 160° C. and pressed with a pressure of 40 bar for about 20 minutes while contacting a stamper on which a predetermined pattern prepared in advance was formed, and thereby the pattern of the stamper was transferred onto the resist layer. Then, a remaining layer present at a concave portion of the imprinted pattern was removed. A resin layer prepared as described above had a concavo-convex shape on which a shape of a convex portion (2) is transferred as shown in FIGS. 1 and 2, and had a pitch (corresponding to "P" in FIG. 2) of about 150 nm, a width of the concave portion (corresponding to "W" in FIG. 2) of about 75 nm, and a depth of the concave portion (corresponding to "H" in FIG. 1) of about 150 nm.

Subsequently, the concavo-convex layer was spin coated with a solution in which titanium isopropoxide (Ti-isopropoxide) was diluted with ethanol to about 0.001 wt % at about 2,000 rpm, and then dried at a temperature of 60° C. for 3 minutes. Then, the substrate was immersed in an aluminum precursor solution heated to 80° C. for about 1 minute such that aluminum was uniformly grown according to a catalyst layer. Through the above-described processes, a polarized light splitting element A on which an aluminum convex portion having a width of about 75 nm, a pitch of about 150 nm, and a height of about 150 nm was prepared.

Example 2

Preparation of Polarized Light Splitting Element B

The prepared aluminum precursor solution was coated on a first substrate using a bar coater to have a thickness in the range of about 3 to 4 µm, and then a solvent was dried. Then, a second substrate on which the concavo-convex layer was formed was spin coated with a solution in which Ti-isopropoxide was diluted with ethanol to about 0.001 wt % at about 2,000 rpm, and then dried at a temperature of 60° C. for about 3 minutes in a same manner as in Example 1. Thereafter, the first substrate coated with the aluminum precursor solution was placed on the catalytically coated second substrate heated to 100° C. in advance such that the first substrate faced the second substrate, reacted for 3 minutes such that aluminum was uniformly grown according to a catalyst layer, and thereby a polarized light splitting element B was prepared.

Comparative Example

Aluminum nanoparticles having an average diameter of 60 nm were dispersed at a content of 3 wt % in an ethanol solvent, 0.05 wt % of Glide 410 which was a coating enhancement agent was added to the solution, and thereby a coating solution in which aluminum nanoparticles are dispersed was prepared. The solution was coated on the substrate on which the concavo-convex layer was formed at 1,000 rpm and dried at room temperature. Protruding nanoparticles on an upper part of the concavo-convex layer were removed through a rubbing process, and thereby a polarized light splitting element filled with aluminum nanoparticles was prepared.

Experimental Example

Performance Analysis for Polarized Light Splitting Element of Example and Comparative Example $T_p$ (transmittance of S-polarized light) and $T_c$ (transmittance of P-polarized light) of the polarized light splitting element of the examples and comparative example with respect to light with the wavelength of 400 nm, 550 nm and 800 nm were measured using an Axo-scan polarized light transmission and reflection spectrum measuring apparatus, the results thereof were substituted in Expression 2 to measure a degree of polarization D, and then the results thereof were described in the following Table 1.

TABLE 1

| Wavelength (nm) | Example 1 | Example 2 | Comparative Example |
|---|---|---|---|
| 400 | 0.91 | 0.91 | 0.69 |
| 550 | 0.92 | 0.92 | 0.76 |
| 800 | 0.95 | 0.95 | 0.57 |

DESCRIPTION OF SYMBOLS OF MAIN PARTS IN DRAWINGS 2, 2a: metal convex portion
2b: concave portion 1, 10, 11, 12, 100, 200: substrate, base material layer
15: resin layer
20: metal precursor solution layer
25: metal convex portion
30: catalyst layer

The invention claimed is:

1. A method for manufacturing a polarized light splitting element, comprising a step of forming two or more metal convex portions having a stripe shape and disposed in parallel on a concavo-convex layer from a solution including a metal precursor, and ether or alcohol, and wherein the forming of the metal convex portion comprises changing the metal precursor into a metal in a state in which a first substrate, in which a solution layer including the metal precursor is formed on one surface thereof, and a second substrate, in which a concavo-convex layer is formed on one surface thereof, are laminated so as to respectively face the solution layer including the metal precursor and the concavo-convex layer.

2. The method of claim 1, wherein the metal precursor is an aluminum precursor, a platinum precursor, or a silver precursor.

3. The method of claim 1, wherein the metal precursor is a metal hydride.

4. The method of claim 1, wherein concentration of the metal precursor in the solution including the metal precursor is in the range of 0.1 to 30 wt %.

5. The method of claim 1, wherein the metal precursor is represented by the following Formula 1:

$$R_nQ[XA_m]_p \qquad \text{[Formula 1]}$$

wherein R is hydrogen or an alkyl group, Q is Al, Pt or Ag, X is a group 15 or group 16 element, or is absent, A is a halogen atom, an alkyl group or a hetero ring residue having nitrogen atoms and carbon atoms as a ring-forming atom, n is an integer in the range of 1 to 4, m is an integer in the range of 1 to 8, p is an integer in the range of 1 to 2, and when n is 2 or more, at least one of R is hydrogen.

6. The method of claim 1, wherein the metal convex portions are formed such that a pitch of the metal convex portions in parallel is in the range of 80 to 400 nm.

7. The method of claim 6, wherein the metal convex portions are formed such that a ratio H/P of a height H to the pitch P thereof is in the range of 0.2 to 1.5.

8. The method of claim 1, wherein the converting of the metal precursor into a metal comprises performing heat treatment on the metal precursor.

9. The method of claim 1, wherein the concave portion of the concavo-convex layer is coated with a catalyst.

10. The method of claim 9, wherein the catalyst is a titanium alkoxide, a titanium halide, a chelate compound of titanium halide, an iron alkoxide, a silicon halide, a vanadium oxyhalide, titanium boron hydride, or a chelate compound of titanium boron hydride.

11. The method of claim 9, wherein the catalyst is a metal or a metal composite.

12. The method of claim 11, wherein the metal or the metal composite includes one or more metals selected from the group consisting of Ti, Pd, Pt, Al, Cu, Si, Au, and Fe.

13. The method of claim 1, further comprising removing the concavo-convex layer after the metal convex portion is formed.

14. A polarized light splitting element comprising:
a base material layer; and
two or more metal convex portions formed on the base material layer, having a stripe shape, and disposed in parallel,
wherein the two or more metal convex portions have a degree of polarization D of 0.8 or more according to the following Expression 2:

$$D=(T_P-T_C)/(T_P+T_C) \qquad \text{[Expression 2]}$$

wherein $T_P$ is transmittance of light with the wavelength of 400 nm polarized parallel to the metal convex portion having a stripe shape with respect to the polarized light splitting element, and $T_C$ is transmittance of light with the wavelength of 400 nm polarized in a direction perpendicular to the metal convex portion having a stripe shape with respect to the polarized light splitting element, and
wherein the polarized light splitting element is manufactured according to the method of claim 1.

15. The polarized light splitting element of claim 14, wherein the metal convex portion is formed from a metal precursor.

16. The polarized light splitting element of claim 14, which is manufactured through a solution process using a solution including a metal precursor.

17. The method of claim 1, wherein the converting of the metal precursor into a metal comprises performing heat treatment on the metal precursor.

18. The method of claim 1, wherein the concave portion of the concavo-convex layer is coated with a catalyst.

19. The method of claim 1, further comprising removing the concavo-convex layer after the metal convex portion is formed.

* * * * *